United States Patent [19]

Couper

[11] Patent Number: 5,110,115
[45] Date of Patent: May 5, 1992

[54] DOCUMENT TRANSPORT AND DETECTION APPARATUS

[75] Inventor: John Couper, Mid Calder, Scotland

[73] Assignee: Unisys Corporation, Blue Bell, Pa.

[21] Appl. No.: 495,594

[22] Filed: Mar. 16, 1990

[30] Foreign Application Priority Data

Apr. 5, 1989 [GB] United Kingdom ............. 8907756

[51] Int. Cl.$^5$ .................................. B65H 7/02
[52] U.S. Cl. .............................. 271/265; 271/272; 198/624; 198/781
[58] Field of Search ............... 200/61.13; 324/699; 340/675, 674; 271/265, 259, 263, 272–274; 198/624, 781

[56] References Cited

U.S. PATENT DOCUMENTS

| | | | |
|---|---|---|---|
| 3,609,735 | 10/1971 | Dauterman et al. | 271/263 |
| 3,868,666 | 2/1975 | Hartwig et al. | 340/674 |
| 4,243,216 | 1/1981 | Mazumder | 340/674 |
| 4,548,394 | 10/1985 | Koyama et al. | 271/272 |
| 4,558,373 | 12/1985 | Plasencia et al. | 271/273 |
| 4,563,633 | 1/1986 | Johnson et al. | 200/61.13 |

Primary Examiner—H. Grant Skaggs
Attorney, Agent, or Firm—Whitham & Marhoefer

[57] ABSTRACT

An apparatus for moving a document 10 along a track 12 comprises conductive driven members 16 and idler member 18 together with circuit 54 for detecting electrical continuity there-between. Presence of an insulating document 10 between the members 16, 18 breaks an electrical circuit. The driven member 16 has a motor 36 controlled by a motor control switch 38b which can receive a control signal 40 to switch the motor on and another control signal 42 to switch the motor off. Space along a track, drive sets 14 cooperate to move a document along the track 12 with only 2 drive sets switched on at any time and without need for central control.

3 Claims, 3 Drawing Sheets

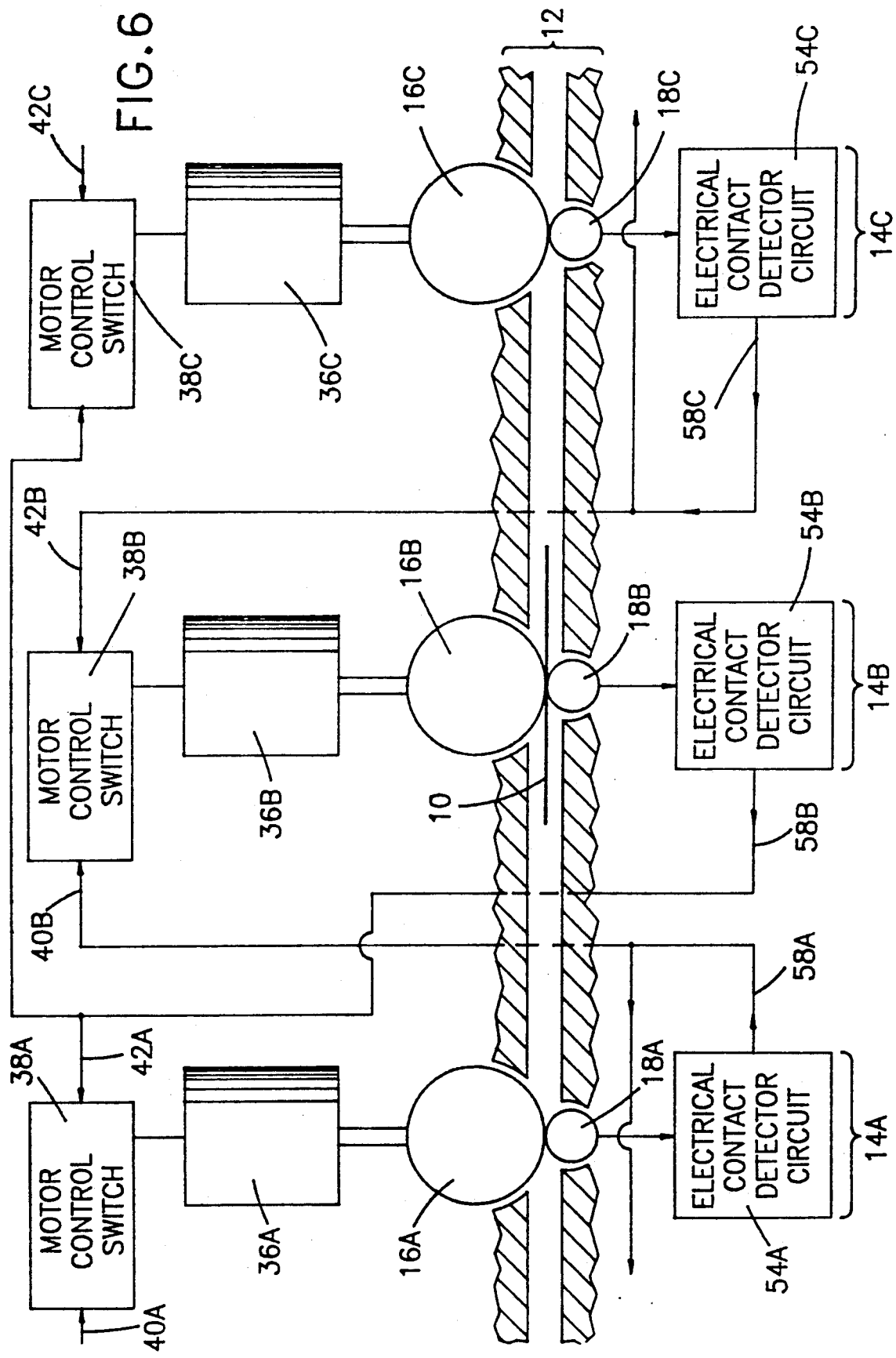

DOCUMENT TRANSPORT AND DETECTION APPARATUS

BACKGROUND OF THE INVENTION

1. Field of the Invention

The present invention relates to an apparatus for transporting a document along a track. It particularly relates to an apparatus operative, not only to transport the document, but also to detect and provide indication when the document is present in the track.

Document encoding machines are used for automatic processing of documents, such as checks, invoices and other financial instruments. In such machines, the document is selected from one or more input hoppers and then passed along a track where data is read from the document, where visual images of the documents are captured, and where further data is printed upon the document. At the end of the track, the document is placed in a selected output stacker according to its detected nature.

Document and check sorters and encoders work at high speed. Moving documents require large amounts of power. It is therefore the practice to provide means whereby the progress of a document along a track is monitored by sensors. Documents move between walls in a track. Openings in the walls allow various combinations of wheels and belts to urge documents along the track and allow sensor elements to detect the presence of a document. These sensor elements, in the prior art, comprise optical sensors having a light source and a light detector, the light path between the two being broken by interjection of a document. Such sensors are costly and require sensitive and specialized electronic elements for their function. The more holes and apertures there are in track walls, the more likely it is that a document may become jammed and the more often servicing is required to remove dust, debris and other foreign matter from unnecessary apertures.

SUMMARY OF THE INVENTION

The present invention consists in an apparatus for transporting a document along a track, said apparatus comprising a main drive set, said main drive set comprising a driven member for urging a document along the track; an idler member, opposed to said driven member, said driven member and said idler member being cooperative to engage a document therebetween; and a contact detector, operative to detect when said driven member is not in contact with said idler member; indication of non-contact by said contact detection means being indicative of presence of a document between said driven member and said idler member.

In the prior art, it has been known to detect movement of items such as a document by means of microswitches and other mechanical elements. Induced transverse movement is so small that detection is difficult. In order to overcome this difficulty, the present invention provides that the driven member is electrically conductive, that the idler member is electrically conductive, and that the contact detection is operative to detect when a document interrupts electrical continuity between the driven member and the idler member. The present invention provides that the driven member comprises an electrically conductive driven wheel and the idler member comprises a corresponding electrically conductive idler wheel, one, the other, or both being made either, from electrically conductive elastic compounds, such as carbon or metal loaded rubber, or one, or other, or both comprising a plurality of radial conductors embedded in an electrically non-conductive elastic medium.

Detection of a document along a track, in the prior art, was used as a signal to a central controller to send out control signals to one or more drive sets along the document track. The present invention provides for elimination of the central controller by providing that the main drive set is selectably operable to apply drive to the driven member, the apparatus comprising a first detector for detecting a document on the track which is about to reach the main drive set, and the main drive set being responsive to output from the first detector indicating a document to initiate drive to said driven member.

The present invention further seeks to eliminate necessity for a central controller by providing that the main drive set is selectably operable to remove drive from the driven member, the apparatus comprising a second detector for detecting a document on the track which has just left the main drive set, and the main drive set being responsive to output from said second detector, detecting the document, to remove drive from the driven member. In this way, the main drive set is switched on and then switched off as a document passes through, without intervention from any central controller.

In order further to automate the process of document transportation, and further to eliminate the necessity for a central controller of any kind, the present invention further provides that the first detector is in fact an upstream drive set, that the second detector is, in fact, a downstream drive set, and wherein the downstream drive set is responsive to detection of a document by the main drive set to cease to apply drive to its respective driven member, and wherein the upstream driven set, the main drive set and the downstream drive set are cooperative thereby automatically to provide drive, in sequence to a document on the track in sympathy with the actual speed of passage of the document therealong.

In a preferred embodiment, each drive set comprises a driven wheel and an idler wheel on an insulated pivot arm. An electrical contact detector circuit detects electrical continuity between the shafts of the driven wheel and of the idler wheel. Each driven wheel is driven by a motor which, in turn, is controlled by a motor control switch. For preference, the electrical contact detector circuits comprise a logical gate whose output becomes logically false when electrical contact is broken between the drive wheel and the idler wheel. For preference, the motor control switch comprises a set/reset flip-flop whose output is used to drive a transistor, activating the motor turning the driven wheel. Drive sets are provided at spaced intervals along a document track. Detection of a document between the drive wheel and the idler wheel of any particular drive set switches off the motor in the previous drive set and switches on the motor in the next succeeding drive set. In this way, only two motors at any time are activated along the document path and the passage of the document itself initiates the switching sequence.

BRIEF DESCRIPTION OF THE DRAWINGS

The present invention is further explained, by way of an example, by the following description taken in conjunction with the appended drawings in which;

FIG. 6 is a schematic diagram of a document track employing self-controlling, spaced drive sets.

DETAILED DESCRIPTION OF A PREFERRED EMBODIMENT OF THE INVENTION

Figure 1:
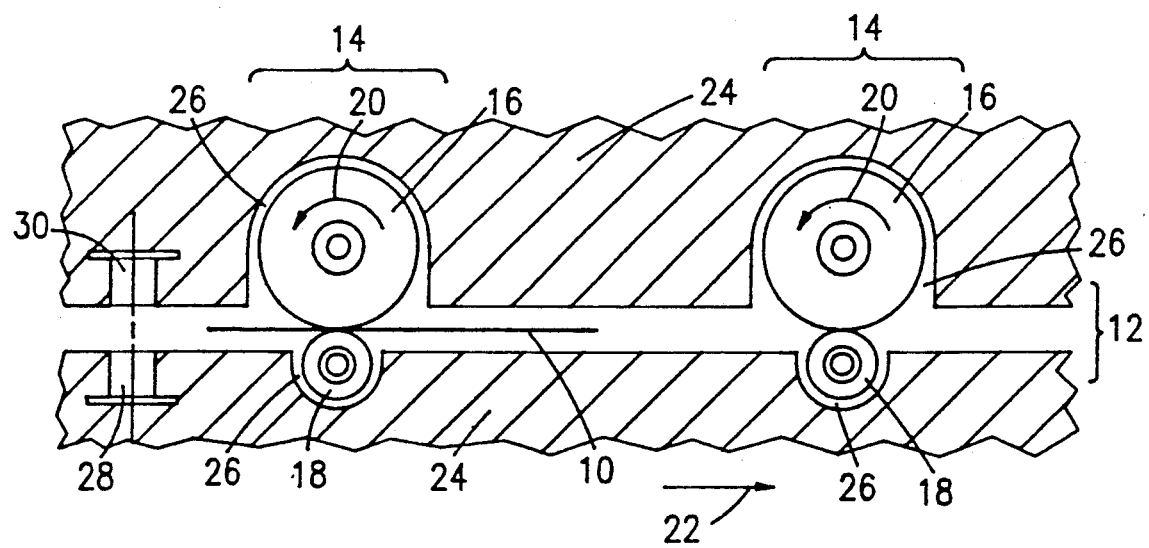
FIG. 1 is a plan schematic diagram of a document track and also shows features of the prior art.

FIG. 1 shows a plan view, in schematic manner, of a document track. A document 10 moves along a track 12 gripped between sequential, spaced pairs of drive sets 14. Each drive set 14 comprises a driven wheel 16, opposed to and elastically urged against an idler wheel 18 wherebetween the document is gripped. Each driven wheel 16 is urged to rotate as indicated by a first arrow 20 to move the document 10 along the track 12 as indicated by a second arrow 22. The track 12 is bounded by track walls 24 and each driven wheel 16 and idler wheel 18 accesses the document 10 in the track 12 through apertures 26 in track wall 24.

In the prior art, it has been the custom to provide document sensors along the track 12 in the form of a light source 28 and a photo detector 30, a light beam across the path of the document 10 being interrupted when the document is therebetween. This way, a central controller (not shown in FIG. 1) can monitor the progress of the document 10 along the track 12 and can activate appropriate drive sets 14 or printing/date retrieval devices for use on the document 10. It is the purpose of the present invention to eliminate the necessity of such items as the light source 28 and photo detector 30 which cause additional apertures to be required to be made in track walls 24, giving additional edges wherein the document can catch and apertures whose function can be impaired by accretion of debris.

Figure 2:
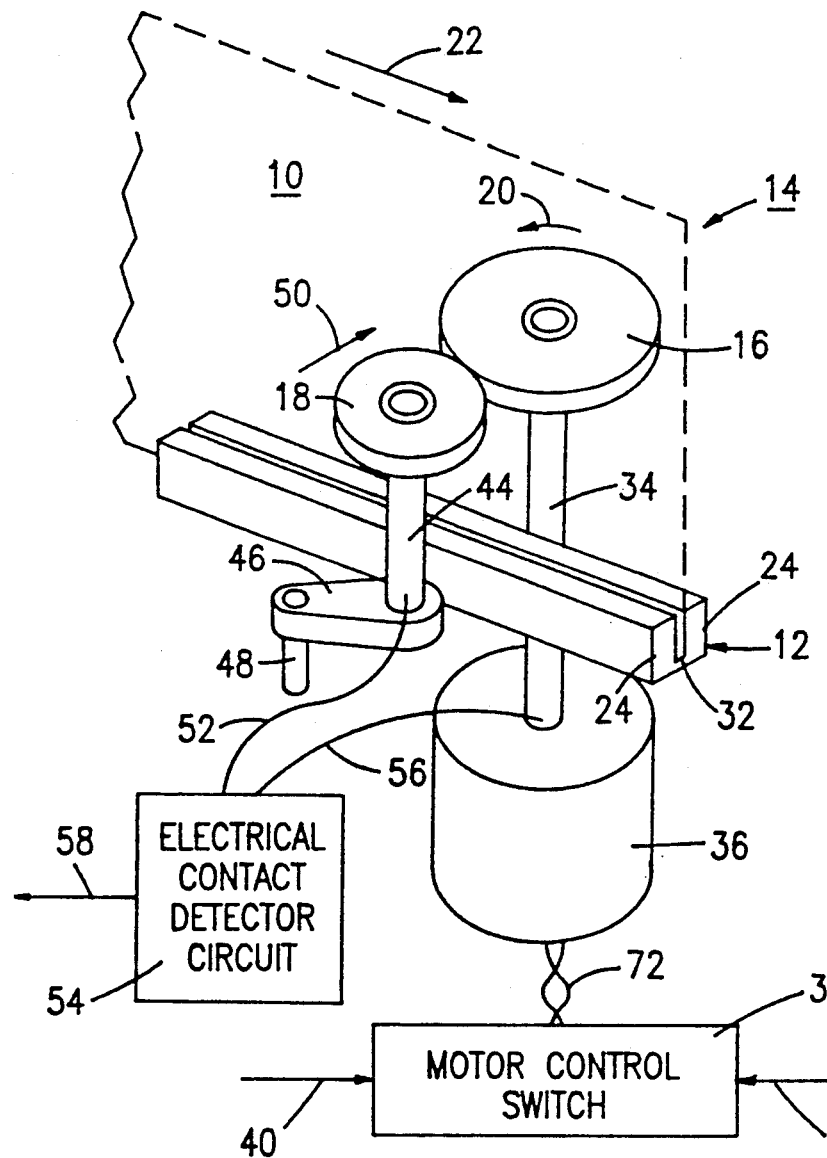
FIG. 2 is a projected view of a drive wheel and idler wheel pair according to the present invention.

FIG. 2 shows a projected view of a drive set 14 according to the preferred embodiment of the present invention. In FIG. 2, the document 10 is shown in phantom outline. The track 12 comprises a slot 32 along which the document 10 travels. The track walls 24 are shown in shortened, abbreviated form for purposes of clarity. It is to be understood that the driven wheel 16 and the idler wheel 18 both project through apertures in the track walls 24 and that the track walls 24 extend therearound.

The driven wheel 16 is supported on a driven wheel shaft 34, in turn rotated by a motor 36. The motor 36 is controlled by a motor controlled switch 38, driven by a first motor control line 40 which causes the motor 36 to be switched on and by a second motor control line 42 which causes the motor 36 to be switched off.

The idler wheel 18 is supported on an idler wheel shaft 44 whereon the idler wheel 18 is free to rotate. The idler wheel shaft 44 is in turn mounted on an insulated pivot arm 46 held to rotate on a fixed pivot 48 and urged, as indicated by a third arrow 50, by means of a spring (not shown) for the idler wheel 18 to push against the driven wheel 16 and to hold any document 10 therebetween. Rotation of the driven wheel 16 causes the document 10 to move as indicated by the second arrow 22 (FIG. 1).

An idler wheel connection 52 provides electrical connection between the idler wheel shaft 44 and an electrical contact detector circuit 54, driven wheel connector 56 provides electrical contact between the driven wheel shaft 34 and the electrical contact detector circuit 54. The driven wheel connector 56 can be connected to the driven wheel shaft either through the body of the motor 36, or by means of sliprings, brushes or any means known in the art.

Both the idler wheel 18 and the driven wheel 16 are electrically conductive. Thus, when no document 10 is present between the idler wheel 18 and the driven wheel 16, an electrical circuit is completed and the electrical contact detector circuit 54 detects the presence of electrical continuity between the idler wheel 16 and the driven wheel 18. When the document 10, being an insulator, is introduced between the driven wheel 16 and the idler wheel 18, the electrical contact detector circuit 54 detects the breaking of the electrical circuit and provides an output 58 indicative of that state. The output 58 of the electrical contact detector circuit 54 thus indicates that a document 10 is present in the drive set 14.

It is to be understood that the drive wheel 16 may be replaced by combinations of wheels and belts as is well known in the art. Likewise, the idler wheel 18 can also be replaced by belts and pulleys. All that is required is that electrical connection between whichever is the driven member (in this instance, the drive wheel 16), and whichever is the idler member (the idler wheel 18) is broken by interjection of a document 10 therebetween.

Figure 3:
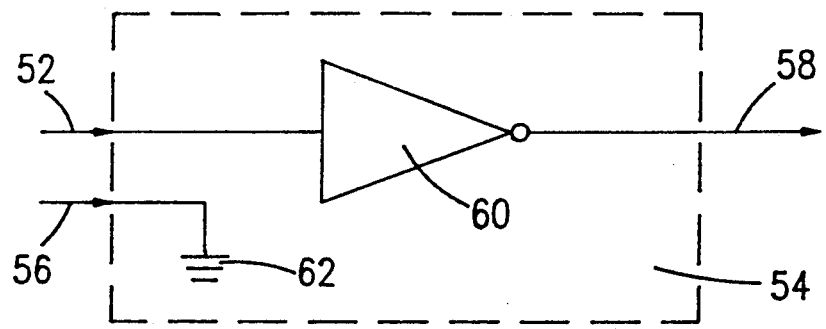
FIG. 3 is a schematic block diagram of one possible type of electrical contact detector circuit as shown in FIG. 2.

FIG. 3 shows a schematic diagram of the electrical contact detector circuit 54 of FIG. 2. The driven wheel connector 56 is connected to a logical 'O' ground point (62). The idler wheel connector 52 is connected as an input to a logic inverter 60. When the idler wheel 18 is in electrical contact with the driven wheel 16, the input of the inverter 60 is logically false and the inverter 60 provides output 58 which is logically true. When a document 10 is interposed between the driven wheel 16 and the idler wheel 18, the input to the inverter 60 is logically true and the output 58 of the inverter 60 is logically false.

Figure 4:
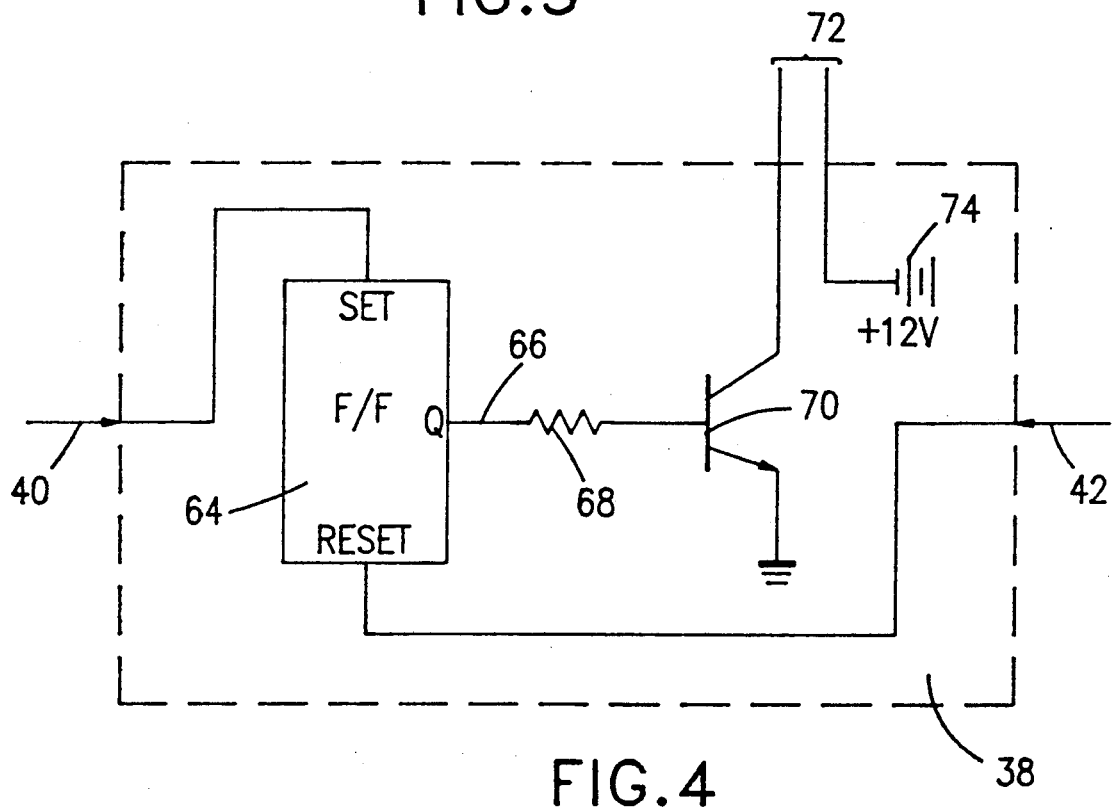
FIG. 4 is a schematic block diagram of the motor control switch shown in FIG. 2.

FIG. 4 shows a schematic block diagram of the motor control switch 38 of FIG. 2. A set/reset flip-flop 64 is set by a logically true signal on the first motor control line 40 and is reset by a logically true signal on the second motor control line 42. When the flip-flop 64 is set, output 66 of the flip-flop 64 drives, through a resistor 68, the base of a power transistor 70 to deliver power, via power lines 72, to the motor 36 from a power source 74.

Figure 5:
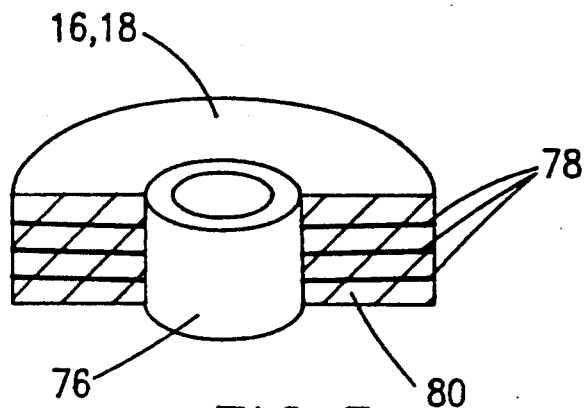
FIG. 5 is a partly cut away view of a drive wheel or an idler wheel employing radially encapsulated conductors.

FIG. 5 shows a partially cut away view of one of the wheels 18, 16 of FIGS. 1 and 2. It is preferred that the wheels can be of electrically conductive elastic material. Suitable materials include metal and carbon granule loaded rubber. Other polymers may similarly be used. Each wheel comprises a hub 76 of conductive material which makes contact with the respective shaft 34, 44. Another embodiment provides that radial wires 78 of any suitable conductive material, such as copper or bronze, are embedded in non-conductive elastic material 80. Ends of the wires 78 protrude at the surface of the wheel 16, 18 to provide for electrical conductivity to the hub 76. Both wheels 16, 18 can be of the same type, or one wheel can be of conductive compound whereas the other wheel employs wire 78. The non-conductive elastic material 80 can also be replaced by conductive elastic material doubly to ensure electric conductivity.

FIG. 6 is a schematic diagram of a document transport apparatus employing a succession of drive sets 14. The main drive set 14b is preceded in the track 12 by an upstream drive set 14a and is followed by a downstream drive set 14c. A document 10, passing along the track 12, passes first through the upstream drive set 14a, then through the main drive set 14b, and thereafter through the downstream drive set 14c. It is to be understood that the three drive sets 14 shown in FIG. 6 are not restrictive in number, but are representative of a track along which a large plurality of drive sets 14 may be connected, as is later described, in order automatically to move a document 10 along the track 12 without need of any form of central controller.

When a document 10 is introduced between the drive wheel 16a and the idler wheel 18a of the upstream drive set 14a, assuming that the motor control switch 38a of the upstream drive set 14a has been activated, the electrical contact detector circuit 54a of the upstream drive set 14a provides a logically true output signal 58a indicating that the document 10 is in the upstream drive set 14a. The output 58a of the upstream drive set 14a electrical contact detector circuit 54a is provided as the first motor control input 40b to the motor control switch 38b of the main drive set 14b. This causes the motor 36b of the main drive set 14b to be switched on and the driven wheel 16b of the main drive set 14b commences to rotate and comes up to proper, full speed. All this time, the document 10 being driven by the driven wheel 16a of the upstream drive set 14a. As will later become apparent, the output 58a of the electrical contact detector circuit 54a of the upstream drive set 14a is used to switch off an earlier drive set.

As the document 10 progresses along the track 12, it enters the pinch between the driven wheel 16b and the idler wheel 18b of the main drive set 14b. The electrical contact detector circuit 54b of the main drive set 14b now provides an output 58b indicative of the document 10 being in the drive set 14b. The output 58b of the electrical contact circuit 54b of the main drive set 14b is provided as a second motor control line 42a to the motor control switch 38a of the first drive set 14a and causes the motor 36a of the first drive set 14a to be switched off. Thus, as the document 10 passes from the first drive set 14a to the main drive set 14b, so the motive means of 36a of the first drive set 14a is switched off, thus conserving power.

With the document 10 between the driven wheel 16b and the idler wheel 18b of the main drive set 14b, the logically true output 58b of the electrical contact detector circuit 54b of the main drive set 14b is also provided as the first motor control line 40c to the motor control switch 38c of the downstream drive set 14c. This has the effect of causing the motor 36c of the downstream drive set 14c to be switched on to bring the driven wheel 16c of the downstream drive set 14c up to speed prior to receiving the document 10.

As the document 10 leaves the main drive set 14b and enters between the driven wheel 16c and the idler wheel 18c of the downstream drive set 14c, so the electrical contact detector circuit 54c of the downstream drive set 14c provides a logically true output 58c, used as the second motor control line 42b to the motor control switch 38b of the main drive set 14b to switch off the motor 36b of the main drive set 14b. The output 58c of the electrical contact detector circuit 54c of the downstream drive set 14c is also connected to a later further downstream drive set to switch on its motor 36 to bring its driven wheel 16 up to speed.

By using the above connection of drive sets in a track of any length it is possible only to have two motors switched on at any time. This saves power, the passage of the document 10 itself controls the switching, and no central controller of any kind is required for synchronization. The outputs 58 of the electrical contact detector circuits can, if required, also be connected to a central controller for monitoring purposes.

It is to be understood that the switching on and switching off behavior of the main drive set 16b, in one embodiment of the invention, can also be achieved by means of replacing the upstream drive set 14a with a simple document detector, and by replacing the downstream drive set 14c with another simple document detector, together with appropriate prior art drive means.

While the invention has been described in terms of a single preferred implementation, those skilled in the art will recognize that the invention can be practiced in various implementations within the spirit and scope of the appended claims.

Having thus described my invention, what I claim as new and desire to secure by Letters Patent is as follows:

1. An apparatus for transporting a document along a track, said apparatus comprising:
   a drive set, said drive set comprising a driven member for urging a document along the track;
   an idler member, opposed to said driven member, said driven member and said idler member being cooperative to engage a document there-between;
   said drive set selectably operable to energize a motor to apply drive to said driven member;
   said drive set selectably operable to cut power to said motor to remove drive from said driven member;
   a first detector for detecting a document on the track about to reach said drive set, said drive set being responsive to said first detector detecting a document to energize said motor to apply drive to said driven member;
   detection means responsive to a change in electrical impedance between said driven member and said idler member to indicate the presence of a document between said driven member and said idler member; and
   a second detector for detecting a document on the track having left said drive set, said drive set being responsive to said second detector detecting a document to cut power to said motor to remove drive from said driven member.

2. An apparatus for transporting a document along a track, said apparatus comprising:
   a main drive set, said main drive set comprising a main driven member for urging a document along the track, and a main idler member, opposed to said driven member, said driven member and said idler member being cooperative to engage a document there-between;

said main drive set selectably operable to energize a main motor to apply drive to said main driven member;

said main drive set selectably operable to cut power to said main motor to remove drive from said driven member;

an upstream drive set comprising an upstream driven member for urging a document along the track and an upstream idler member opposed to said driven member upstream detector means responsive to a change in electrical impedance between said upstream driven member and said upstream idler member to indicate the presence of a document between said upstream driven member and said upstream idler member;

said main drive set responsive to said upstream detector means detecting a document to energize said main motor to apply drive to said main driven member a downstream drive set comprising a downstream driven member for urging a document along the track and a downstream idler member opposed to said driven member, downstream detector means responsive to a change in electrical impedance between said downstream driven member and said downstream idler member to indicate the presence of a document between said downstream driven member and said downstream idler member; and said main drive set responsive to said downstream detector means detecting a document to cut power to said main motor to remove drive from said main driven member.

3. An apparatus according to claim 1 wherein said first detector is an upstream drive set, wherein said second detector is a downstream drive set, wherein said upstream drive set is responsive to detection of a document by said drive set to cease to apply drive to its respective driven member, and wherein said upstream drive set, said drive set and said downstream drive set are cooperative thereby automatically to apply drive, in sequence, to a document the track in sympathy with the actual speed of the passage of the document.

* * * * *